3,461,105
REMOVING ORGANIC ACCELERATORS FROM
VULCANIZED ELASTOMERS
Roy S. Anderson, Spartanburg, S.C., assignor to Deering
Milliken Research Corporation, Spartanburg, S.C., a
corporation of Delaware
No Drawing. Filed Aug. 9, 1966, Ser. No. 571,173
Int. Cl. C08d 13/24; C08c 17/26
U.S. Cl. 260—75                          10 Claims

ABSTRACT OF THE DISCLOSURE

Organic accelerators utilized in the preparation of vulcanized synthetic elastomers are removed from the elastomers by contacting the elastomers with a carboxylic acid. Removal of these accelerators, especially thiazole accelerators, reduces skin irritation by the elastomer.

---

This invention relates into a novel method for removing organic accelerators from vulcanized compositions, and in a more particular sense to a method of removing thiazole derivatives from vulcanized synthetic compositions.

Vulcanization is a term applied to the process where elastomers, natural and synthetic, are treated with certain chemicals to improve their strength and durability. In general, vulcanization will effect the following changes in raw elastomers: increase in tensile strength; elimination of tackiness; decrease in solubility in various solvents; increase in elasticity; and decrease in temperature sensitivity. These improved properties can be obtained by treating the raw elastomer with sulfur in the presence of other chemicals such as accelerators. In the vulcanization of certain synthetic rubbers such as the silicone rubbers, agents other than sulfur have been utilized. Examples of such vulcanization agents include peroxides such as benzoyl peroxide and tert-butyl hydroperoxide; diazoaminobenzine and its N-alkyl and N-aryl derivatives; tetraalkylthiuron disulfides; and the various quinones.

The exact nature of the reaction which occurs is not fully understood, and need not be discussed in this application. It is known, of course, that the presence of accelerators in the vulcanization process is desirable since accelerators enable the vulcanization reaction to be carried out in a shorter period of time at a lower temperature. In some cases, vulcanization can be effected at room temperature. Furthermore, the amount of sulfur may be reduced when an accelerator is incorporated into the vulcanization mixture. The use of smaller amounts of sulfur often results in the preparation of compositions with improved oxidation resistance especially since many of the common accelerators are good antioxidants.

On the other hand, when large amounts of accelerators are utilized in the vulcanization process, the resulting composition contains appreciable amounts of the accelerator or decomposition products thereof. Although the presence of appreciable amounts of accelerators in the final composition is not usually detrimental, there are applications where the presence of the accelerator is undesirable. For example, accelerators such as the thiazoles are skin irritants. Thus, consideration of the amount of accelerator present in the vulcanized composition is important where the vulcanized composition is to be used in the preparation of fabrics and articles which may come in contact with the skin. The use of vulcanized rubber containing skin-irritating accelerators in women's under garments such as girdles and brassieres results in considerable discomfort for the consumer and should be avoided.

It is, therefore, an object of this invention to provide a method of removing organic accelerators used in the vulcanization of elastomers upon completion of vulcanization process.

It is a further object of this invention to provide a method of removing skin-irritating compounds from vulcanized compositions.

It is a further object of this invention to provide a method of removing skin-irritating compounds from vulcanized compositions while not diminishing the desirable properties of the composition.

These and other objects of the invention are obtained by providing a method which comprises treating vulcanized synthetic elastomers containing the undesirable accelerators with a lower molecular weight carboxylic acid.

The vulcanized compositions which may be treated in accordance with the method of this invention are the synthetic elastomers such as butadiene-styrene rubbers, neoprene, nitrile rubbers such as those obtained by the reaction of acrylonitrile with butadiene, butyl rubbers, polyacrylic rubber, chloroprene rubber, ethylene-propylene rubber, silicone rubber, polyester rubbers and polyurethane rubbers. The preparation and vulcanization of these classes of synthetic rubbers are well known and have been discussed in many publications such as The Vanderbilt Rubber Handbook, George G. Wilspear, Editor, R. T. Vanderbilt Co. Inc., New York, N.Y., 1958, and Chemistry of Natural and Synthetic Rubbers, Fisher, Reinhold Publishing Corporation, New York, N.Y., 1957.

As mentioned previously, the vulcanization of synthetic rubbers is accelerated by the addition of certain organic compounds. Although most of the known accelerators were developed for use with natural rubber, they are also useful in the vulcanization of synthetic rubber. The synthetic rubbers, however, generally have a lower proportion of unsaturated groups and use slightly higher proportions of accelerators with lower proportions of sulfur. When accelerators are used, the vulcanization mixture generally contains a metallic oxide such as zinc or calcium oxide, and an organic acid. This combination activates the accelerator. Although the mechanism of the combination is not clear, it is known that in some cases a zinc salt of the accelerator or its decomposition product is formed which may then complex or react with sulfur. Examples of the classes of compounds which are useful as accelerators in vulcanization reactions include the thiazoles, dithiocarbamates, xanthates, aldehyde-amines and guanidines.

The method of this invention is particularly useful for treating those vulcanized compositions wherein a thiazole is used as the accelerator. Among the thiazoles which have found utility as accelerators are the following mercaptobenzothiazole, the zinc and potassium salts of mercaptobenzothiazole, dibenzothiazyl dimethyl thiourea and benzothiazyl disulfide. Mercaptobenzothiazole is particularly useful as an activator and has been well known as MBT and "Captax." The structural formula is:

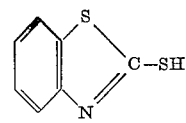

This accelerator is activated by zinc oxide and an organic acid. It is also activated by certain disulfides. The zinc salt, though less active, is also useful.

When mercaptobenzothiazole is oxidized, it is converted into benzothiazyl disulfide, commonly known as "Altax" or MBTS. This accelerator has the following structural formula:

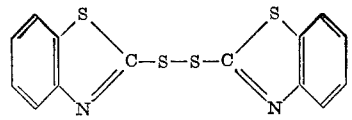

The following formulations illustrate some typical vulcanizable mixtures:

Formulation I: Parts by weight
Elastothane 395 (a polyester (polyurethane) having a molecular weight of about 2,000 and obtained by reacting a glycol with a dicarboxylic acid: Thiokol Chemical Co.) _____ 100.0
Sulfur _____ 2.5
Zinc oxide _____ 5.0
Stearic acid _____ 2.0
Mercaptobenzothiazole _____ 0.5

Formulation II: Parts by weight
Elastothane 395 _____ 100.0
Sulfur _____ 1.5
Zinc oxide _____ 2.0
Stearic acid _____ 1.5
Zinc salt of mercaptobenzothiazole _____ 1.5

Formulation III:
Elastothane 395 _____ 100.0
Sulfur _____ 2.0
Mercaptobenzothiazole _____ 2.0
Benzothiazyl disulfide _____ 4.0
Zinc salt of mercaptobenzothiazole _____ 1.0

Formulation IV:
"Adiprene C" (polyurethane obtained by reacting an aromatic diisocyanate with a poly ether, such as polyethylene oxide, with terminal hydroxyl groups: Du Pont Co.) _____ 100.0
Sulfur _____ 2.0
Benzothiazyl disulfide _____ 2.0
Mercaptobenzothiazole _____ 1.0
Zinc salt of mercaptobenzothiazole _____ 0.5

Formulation V:
Elastothane 455 rubber ( polyurethane elastomer obtained from the Thiokol Chemical Corp.) _____ 100.0
Sulfur _____ 2.0
Benzothiazyl disulfide _____ 4.0
Mercaptobenzothiazole _____ 2.0
Cadmium stearate _____ 0.5

Formulation VI:
Elastothane 455 rubber _____ 100.0
SAF black _____ 30.0
Benzothiazyl disulfide _____ 4.0
Mercaptobenzothiazole _____ 2.0
Cadmium stearate _____ 1.0
Sulfur _____ 2.0

Rubber formulations similar to those given above may be cured by heating the mixture at a temperature of from about room temperature (25° C.) to about 150° C. depending upon the sensitivity of the elastomer and the amount of sulfur and accelerator present in the mixture. As mentioned previously, when large amounts of accelerator are utilized, the vulcanization may be carried out at a lower temperature or for a shorter period of time.

Vulcanized compositions prepared by the process which utilizes organic accelerators such as the thiazoles, generally contain varying amounts of the accelerator. Although the presence of these accelerators, in many instances, is not detrimental and may even be desirable as antioxidants, there are occasions when it is desirable to remove the accelerators after the vulcanization is completed. It has been found, for example, that the presence of the thiazoles in vulcanized elastomers will cause considerable skin irritation. Skin irritation caused by the presence of mercaptobenzothiazole and benzothiazyl disulfide is often severe and may approach a skin irritation level equivalent to first and second degree burns. It is desirable therefore, to remove these harmful accelerators from the vulcanized compositions used in the production of fabrics and garments which come into close contact with skin.

According to the process of this invention, these accelerators may be removed by treating the vulcanized elastomers with a low molecular weight acid which extracts the accelerator from the elastomer. The strength of the acid and the length of the exposure of the elastomer to the acid is determined by the sensitivity of the elastomer being treated. It is possible to treat the vulcanized elastomer with pure acid or a solution of the acid in water or other suitable solvent. It is generally preferred, however, to use dilute aqueous solutions of the acids for extractions. Aqueous solutions containing from about 0.1 to about 50% and preferably from about 0.1 to about 5% of a lower molecular weight carboxylic acid have been found to be especially effective in removing the undesirable accelerators while not affecting the properties of the elastomers or fabrics prepared therefrom.

The lower molecular weight carboxylic acids which find utility in the method of this invention are those having from 1 to 20 carbon atoms. These carboxylic acids include mono- as well as poly-carboxylic acids, and the various, halo-, hydroxy-, and amino-substituted carboxylic acids. Specific examples of the carboxylic acids include formic acid, acetic acid, n-butyric acid, propionic acid, octanoic acid, lauric acid, myristic acid, palmitic acid, tridecanoic acid, stearic acid, oxalic acid, succinic acid, maleic acid, malonic acid, itaconic acid, tetradecane dioic acid, benzoic acid, salicylic acid, chloroacetic acid, trichloroacetic acid, 3-iodopropionic acid, lactic acid, citric acid, bromoacetic acid, glycine acid, 4-aminobutyric acid and beta-alanine.

The carboxylic acids may be brought into contact with the vulcanized elastomers by any of the well known methods such as dipping, spraying, padding and brushing. Most often, the vulcanized rubber is passed through the liquid carboxylic acid several times to effect the extraction, and the thus treated rubber is then rinsed with water to remove residual acid. In manufacturing operations which involve bleaching the vulcanized elastomer, it is desirable to extract the accelerators before the bleaching step since bleaching will often convert the acid-soluble accelerators into acid-insoluble derivatives which cannot be extracted. For example, many soluble mercaptans are oxidized to insoluble disulfides under bleaching conditions.

The utility of the process of this invention is demonstrated by treating a fabric consisting of about 71% nylon and 29% of vulcanized polyurethane elastomer, wherein mercaptobenzothiazole has been used as an accelerator, with aqueous acidic solutions containing varying amounts of acetic acid. In this test, the fabric is passed six times through the acid solution maintained at a temperature of about 130° F., and the acid solution is then analyzed to determine the amount of mercaptobenzothiazole extracted from the fabric. The results, summarized in Table I, indicate the effectiveness of the acid solutions in removing the accelerators from the fabric. The desirable properties of the polyurethane such as tensile strength and elongation were not decreased by the treatment.

TABLE I.—EXTRACTION OF MERCAPTOBENZOTHIAZOLE FROM FABRIC CONTAINING VULCANIZED POLYURETHANE

|   | Treating solution, percent acetic acid | Amount of fabric treated (yds.) | Accelerator concentration in treating solution (gms./100 gals. liquor) |
|---|---|---|---|
| 1 | (¹) | 200 | 0.0 |
| 2 | 0.28 | 25 | 7.95 |
| 3 | 0.84 | 25 | 9.84 |

¹ Control (no acid).

The fabrics treated in accordance with the method this of this invention to remove mercaptobenzothiazole were found to be less irritating to human skin. The desirable result is demonstrated by the results of a test which involved the fabrication of women's brassieres from fabrics comprised of nylon and a vulcanized polyurethane prepared according to Formulation III. The results of this test indicate that the fabric will generally irritate the skin if there is 0.01% or more of mercaptobenzothiazole present in the polyurethane component. Brassieres prepared from these fabrics containing less than this amount of the accelerator in the elastomer component were found to be non-irritating to the skin.

What is claimed is:

1. A process of removing excess organic accelerators used in the preparation of vulcanized synthetic elastomers which comprises contacting the said elastomers with a lower molecular weight carboxylic acid containing from about 1 to 20 carbon atoms for a time sufficient to remove the accelerators from the vulcanized synthetic elastomers.

2. The method of claim 1 wherein the organic accelerator is a thiazole.

3. The method of claim 2 wherein the thiazole is mercaptobenzothiazole.

4. The method of claim 1 wherein the carboxylic acid is acetic acid.

5. A method of removing excess thiazole accelerators used in the vulcanization of synthetic elastomers which comprises contacting the vulcanized elastomers with an aqueous solution of acetic acid for a time sufficient to remove the accelerators from the vulcanized synthetic elastomer.

6. The method of claim 5 wherein the acetic acid solution contains from about 0.1 to about 5% of acetic acid.

7. The method of claim 5 wherein the thiazole accelerator is mercaptobenzothiazole.

8. The method of claim 5 wherein the elastomer is derived from a polyurethane.

9. A method of decreasing skin irritation caused by vulcanized compositions in which the vulcanization is accelerated with thiazole derivatives which comprises contacting said compositions with a lower molecular weight carboxylic acid containing from 1 to 20 carbon atoms for a time sufficient to remove the thiazole derivatives within the vulcanized compositions.

10. The method of claim 9 wherein the lower molecular weight carboxylic acid is acetic acid.

References Cited

Du Pont, Rubber Chemical Division, Report No. 38–8, Aug. 31, 1938, pp. 9–10.

DONALD E. CZAJA, Primary Examiner

D. J. BARRACK, Assistant Examiner

U.S. Cl. X.R.

260—46, 77, 83, 85, 88, 89, 92